United States Patent [19]

McNab

[11] Patent Number: 5,065,902

[45] Date of Patent: Nov. 19, 1991

[54] PNEUMATIC MATERIAL DISPENSING MONITOR

[75] Inventor: John G. McNab, Quebec, Canada

[73] Assignee: Graves Spray Supply, Inc., Clearwater, Fla.

[21] Appl. No.: 528,424

[22] Filed: May 25, 1990

[51] Int. Cl.⁵ .......................... B67D 5/22; G01G 9/00
[52] U.S. Cl. ........................................ 222/31; 222/41;
73/1 R; 73/3; 73/865; 177/50
[58] Field of Search ................. 222/31, 38, 41, 43,
222/47, 48, 77; 73/1 R, 3, 865, 865.9; 177/50;
417/426, 429; 364/567, 568, 571.02

[56] References Cited

U.S. PATENT DOCUMENTS

| | | | |
|---|---|---|---|
| 2,520,546 | 8/1950 | Hughes | 222/31 |
| 3,319,840 | 5/1967 | Oehme et al. | 222/41 X |
| 3,559,451 | 2/1971 | Hyer et al. | 73/1 R X |
| 4,331,262 | 5/1982 | Snyder et al. | 73/3 X |
| 4,431,071 | 2/1984 | Magat et al. | 177/50 X |
| 4,434,647 | 3/1984 | Whitcomb et al. | 73/1 R |

OTHER PUBLICATIONS

Venus–Busmer, "Materials Monitoring Systems", 6th Edition, 1989, pp. 118 & 122.

Primary Examiner—Kevin P. Shaver
Assistant Examiner—Kenneth DeRosa
Attorney, Agent, or Firm—Barnes & Thornburg

[57] ABSTRACT

A material dispensing monitor including an encoder and sensor adjustably mounted to a securement and a pump as a function of specific gravity to produce a series of pulses per cycle of the pump as a function of specific gravity and capacity of the pump so that the pulses provide a direct measure of weight. An all pneumatic system monitors and displays the weight of material dispensed and can provide annunciation when a predetermined weight of material has been dispensed.

19 Claims, 3 Drawing Sheets

PNEUMATIC MATERIAL DISPENSING MONITOR

BACKGROUND AND SUMMARY OF THE INVENTION

The present invention relates generally to material monitors for a dispensing system and more specifically to a nonelectrical monitor and alarm that totals material dispensed for use in hazardous environments.

The use of mechanical indicators such as gauges and another annunciators is well known. With the advent of relatively inexpensive integrated circuits, electrical gauges and alarms have replaced the mechanical gauges and indicators. In certain environments, the possibility of any sort of electrical spark is very hazardous. An example of one such environment is in the plastic and coating spraying industry where resin and catalysts are mixed together and sprayed onto a surface. There are many variables which must be monitored in the spraying environment. The spraying environment generally includes a series of mechanical gauges, operating on pressure, to indicate the pressures throughout the system as well as flow rates. The use of microprocessors and other forms of electrical equipment generate and interpret electric signals to determine the flow and mass rate as well as the total amount of material being dispensed. Optical sensors and other devices are used. Not only are these electrical systems somewhat expensive, but again they cannot be used in hazardous environments where any sort of electrical spark is considered dangerous. Also, electrical systems must meet strict Underwriters and local codes and regulations.

In the prior art material dispensing monitoring, the specific gravity of the material being dispensed had to be known to convert volume to weight of amount of material dispensed. With less sophisticated systems, merely a count of the number of the cycles of the pump was provided and this count value had to be converted using a table knowing the capacity of the pump and the specific gravity of the material being dispensed. In the more sophisticated electronic systems, the specific gravity would also have to be known and provided to the electronics which would then convert it to an appropriate weight of material.

Where the material being dispensed are a mixture of two materials, the specific gravity will vary if the ratio of the components should vary during the dispensing cycles. Similarly, the seals on the pump may become worn and therefore the amount of material dispensed for each cycle of the pump will not be that of the known capacity of the pump. Therefore, the count will not represent the appropriate volume and if a two material system, the ratio of the mixture will vary and thus the density of the mixture. Thus there is a need for a system which will also provide the ability to determine the specific gravity of the material being dispensed.

Thus it is an object of the present invention to provide a material dispensing monitor requiring no electrical parts.

Another object of the present invention is to provide a material dispensing monitor which provides a direct readout of the weight of material being dispensed.

A still even further object of the present invention is to provide a material dispensing monitor which is capable of being used to determine the specific gravity of the material being dispensed.

These and other objects are achieved by providing a pair of telescopic members, a first member having an encoder mounted thereon and a second member having a sensor mounted thereon. The telescopic members are adjustably mounted between a pump and a first securement for determining the displacement of the members relative to each other for a cycle of the pump as a function of the specific gravity of the material being dispensed.

The sensor provides a series of pulses which are generally counted and displayed. The sensor and the counter circuit are pneumatic to determine the weight of material being dispensed. The encoder includes a predetermined plurality of spaced openings corresponding to a predetermined volume per pump cycle such that the displayed count is a direct reading of weight. To connect the telescopic members to the pump, a lever is provided pivotally connected at a one end and driven at its other end by a pump to oscillate about the pivot. The first and second members are connected between the lever and the first securement. The lever and the first securement both include a plurality of openings to which the first and second members are adjustably mounted. Indicia are provided on the plurality of openings to indicate the specific gravity. The lever and the first securement may also include openings for a slave pump.

The monitoring system can also include an alarm system wherein a predetermined weight is selected and the sensed accumulating weight for a particular job is compared against the predetermined weight to provide an alarm or annunciation when the predetermined weight has been reached. This will provide notice to the operator that he has dispensed a predetermined weight of material. A totalizer may also be provided to indicate the total amount of material being dispensed within the course of a predescribed period, for example a day. The alarm or monitoring system includes all pneumatic elements and logic.

A method of determining specific gravity using the encoder and sensor system previously described, includes dispensing a predetermined volume into a container, weighing the predetermined volume, and comparing the weight with the displayed weight using the above encoder and monitoring system. If the measured weight and displayed weight don't agree, adjust the connection of the encoder and sensor to different specific gravity and repeat the filling, weighing, and comparing steps until the weight measured matches the displayed weight. Then, the indicia of the specific gravity will be the specific gravity of the material dispensed. This allows determining the specific gravity of unknown material, or verifying the specific gravity and therefore the mixture of mixed materials being dispensed as well as determining the efficiency of the seals of the pump.

Other objects, advantages and novel features of the present invention will become apparent from the following detailed description of the invention when considered in conjunction with the accompanying drawings.

DETAILED DESCRIPTION OF THE DRAWINGS

Figure 1:
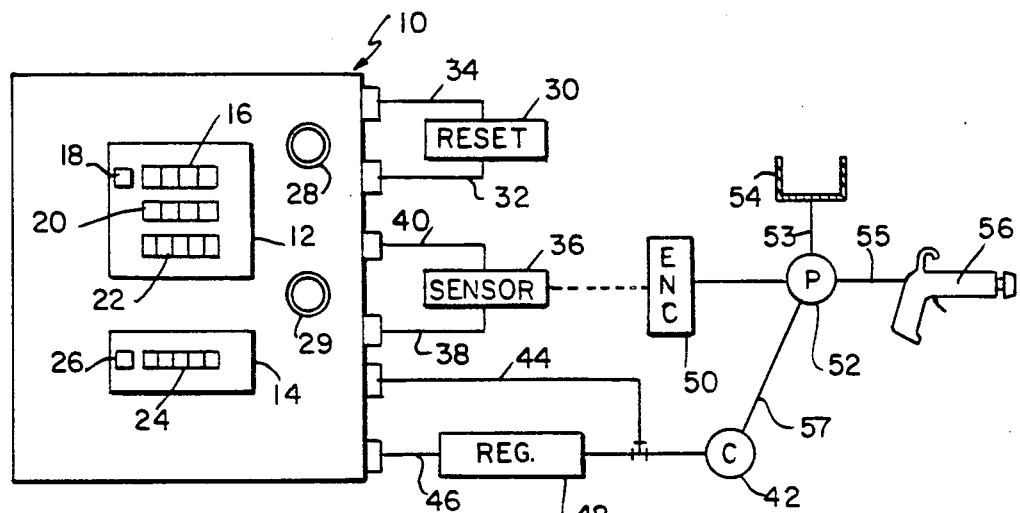
FIG. 1 is a block diagram of the monitor and alarm system of the present invention.

A material dispensing monitor and alarm system is illustrated in FIG. 1. The function of the system is to determine the weight of the material being dispensed on a particular job as well as totalizing the amount of material being dispensed over a given period of time, for example in a day. The amount of material to be dispensed for a given job is entered into the system. A senso determines the number of cycles of operation of the pump and provides counting signals to the counter. When the desired count Per job is reached, an annunciator indicates that the operator should be completing or has completed the job. This provides an indication of the amount of material that should be used. This will help educate the operator and ultimately save material cost. The counter can then be reset and the next job started. At the end of the day the totalizer may be reset.

The present system provides the advantage over the prior art in that it is designed to operate in a hazardous environment and includes no electrical apparatus or devices. It is a pneumatic system including the sensor and all of the logic and displays. A special encoder is also provided such that the signals produced by the sensor will produce a direct reading of the weight. Thus the encoder translates volume in. to weight once the specific density of the material being dispensed is known. The encoder is adjustable for the various specific densities. With the adjustability of the encoder, the system can also be used to determine the specific density of the material being dispensed.

The material dispensing monitor and alarm system includes a housing 10 having a counter 12 and a totalizer 14. The counter 12 includes a changing display 16 driven by the pulses from the sensor, a desired or predetermined count 20 and control or thumbwheels 22 for entering the desired count into countered element 20. A reset button 18 resets the varying count on the counter display 16. The totalizer 14 includes a count display 24 of the total count and a reset button 26 to reset the display 24. A visual annunciator 28 and an audible annunciator 29 are provided.

A pneumatic remote reset 30 is connected to the housing 10 by pneumatic lines 32, 34. A pneumatic sensor 36 is connected to the housing 10 by pneumatic lines 38, 40. A source of compressed air from, for example compressor 42, is provided at a high pressure over line 44 and at a low pressure over line 46 by a regulator 48. The low pressure over line 46 is used in the sensor 36 and provides a faster response sensor. Sensor 36 senses the movement of an encoder 50 which is connected to pump 52 of the dispensing system. Encoder 50 moves with the movement of the pump 52 and this movement is pneumatically sensed by pneumatic sensor 36. The pulses produced by the sensor 36 are counted by counter 12 and totalizer 14.

The dispensing system illustrated includes a reservoir 54 connected to the pump 52 by line 53 and the pump 52 connected to the spray gun 56 by line 55. The compressor 42 which provides compressed air to the monitoring and alarm circuit 10 also provides a compressed air signal over lines 57 to pump 52 as the motivating force to drive the pump 52. Although a spraying system is illustrated, any dispensing system can be monitored using the present system.

Figure 2:
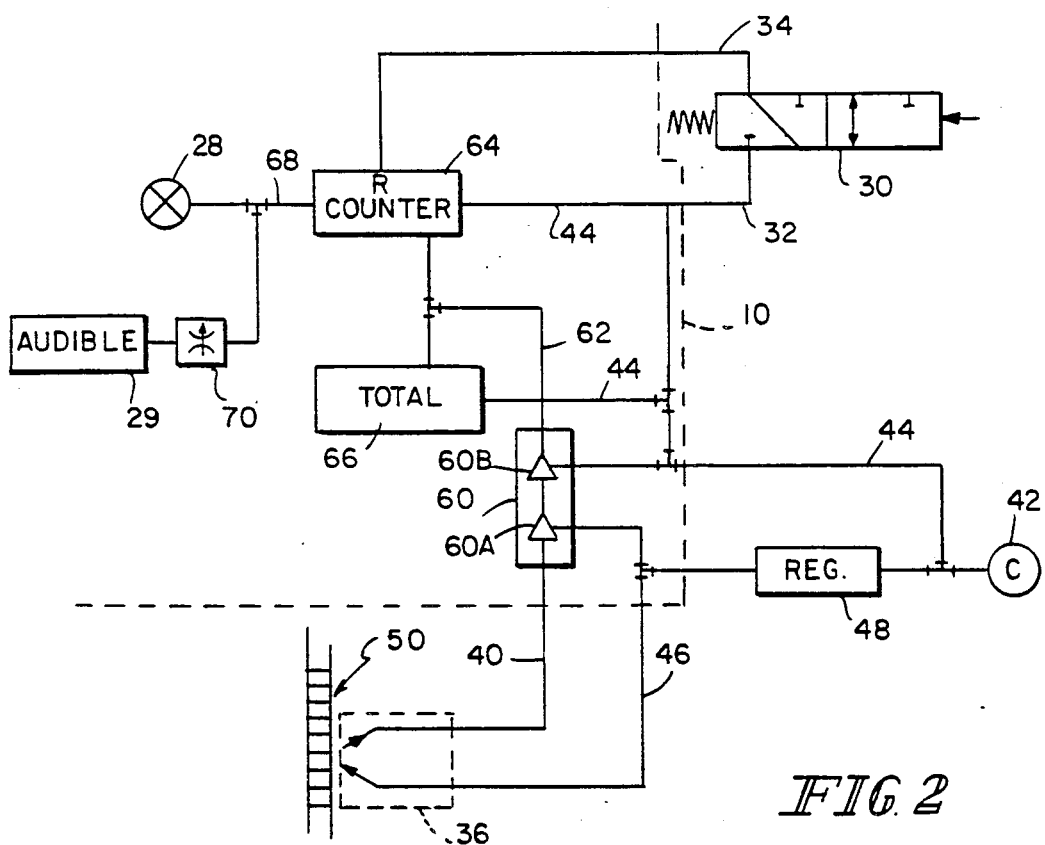
FIG. 2 is a schematic of the fluid circuit logic of the monitoring and alarm system of FIG. 1.

A detailed schematic of the pneumatic system of FIG. 1 is illustrated in FIG. 2. The elements to the left and above the dotted line are those of the housing 10. The low pressure line 46 is provided as an input to the housing 10 and through line 38 to the sensor 36. The output of the sensor 36 is provided over line 40 as an input to the first stage 60A of a dual pneumatic amplifier 60. The pilot line to the first amplifier 60A is from the low pressure line 46. The output of the first amplifier stage 60A is provided to a second amplifier stage 60B whose pilot line is from the high pressure line 44. The output of the amplifier 60 is provided over line 62 as an input to pneumatic counter 64 and totalizer 66. The high pressure line 44 is provided as a pilot line to totalizer 66 and counter 44.

High pressure line 44 is also connected over line 32 to reset 30 with an output over line 34 back to the reset terminal of counter 64. Reset 30 is illustrated as a two position valve which is spring biased to its disconnect position and with an appropriate mechanical force is moved to its connect position. The output of counter 64, when it has reached the desired count, is a signal over line 68 to a visual annunciator 28 and through a variable restriction 70 to an audible annunciator 29. As discussed with respect to FIG. 1, the counter 64 and the totalizer 66 may also be reset by buttons 18, 26 on the face of the housing 10.

The pneumatic counter 12 and totalizer 14 may be, for example, type PZV-S-E and PZA-E-OA-C from Festo Pneumatic. A typical mechanical annunciator could be model OH-22 also available from Festo Pneumatic.

As can be seen from FIGS. 1 and 2, the pneumatic circuit is relatively simple and uses off the shelf elements. There is no special programming provided. A unique encoder 50 and its attachment provides the ability to provide a direct reading of weight for different specific gravity using off the shelf pneumatic elements from the pump 52.

Figure 3:
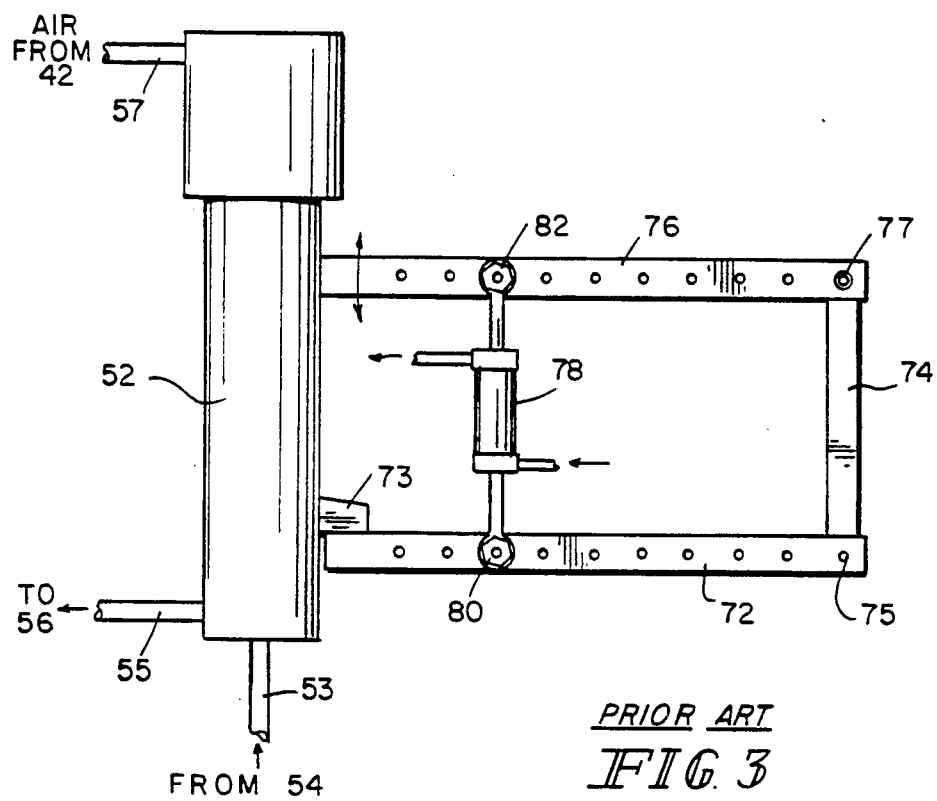
FIG. 3 illustrated a pump and slave pump of the prior art.

A typical pump 52 used in a spraying operation is illustrated in FIG. 3. The pump 52 receives air on line 57 from air compressor 42 to dispense material from a reservoir 54 through line 53 and outputted to a dispensing or spray gun 56 over line 55. In many spraying operations, two materials are mixed either internally or externally and therefore there is a need for a second pump. The relationship of the stroke of the two pumps determines the mixture of the final product. As illustrated in FIG. 3, a second or slave pump 78 is provided. A first lower bar or securement 72 having a plurality of holes therein is secured at 73 to the pump housing 52. An upright 74 is secured at 75 to the first bar 72 and a second or top bar 76 is pivotally connected at 77 to the upright 74. The other end of bar 76, which includes a plurality of holes corresponding to the holes in first bar 72, is connected to the pump 52 to move therewith. Thus the left end of bar 76 oscillates as indicated by the two headed arrow.

The slave pump 78 is connected at its lower end with a fastener 80 to lower bar 72 and its top end by fastener 82 to the top bar 76. The position of the connection of the slave pump 78 to the bars 72, 76 determined the ratio of the displacement of the slave pump 78 to the primary pump 52. Thus using a single prime mover providing the drive signal of air online 57, a pair of pumps 52, 78 can be driven in synchronization.

With the preexisting structure of FIG. 3 to connect the slave pump 78 to the motion of the pump 52, it was advantageous to design an encoder to be connected between the moving bar 76 and the stationary bar 72.

Figure 4:
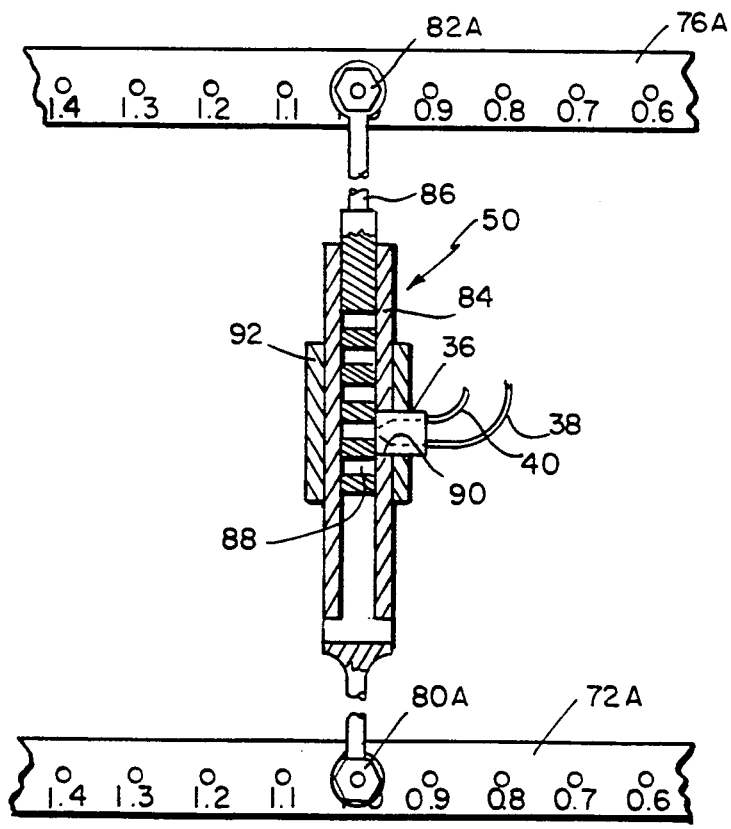
FIG. 4 is a cut away view of the encoder and sensor of the present invention.

As illustrated in FIG. 4, the encoder 50 includes two telescopic members 84, 86. The first member 86 has a plurality of transverse openings or encoders 88 and is received within the second member 84. The pneumatic sensor 36 is mounted in an opening 90 of the second telescopic member 84 and is mounted thereto by a sleeve 92. As the elements 84, 86 move relative to each other, the openings 88 move relative to the sensor 36 which provides a pulse train of air signals as the openings and the lands between the openings traverse the sensor 36.

Encoder 50 is shown mounted between a pair of bars or calibration means 72A, 76A which correspond to the fixed bar 72 and the pivoting bar 76 of the slave pump 78. The first element 86 is mounted to bar 76A by fastener 82A and the second element 84 is mounted to bar 72A by fastener 80A. Thus as bar 76A moves relative to fixed bar 72A, the first element 86 moves relative to the second element 84.

Figure 5:
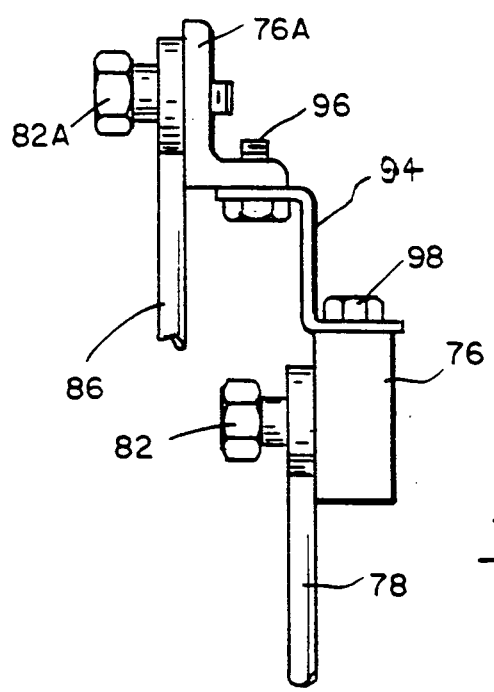
FIG. 5 is a partial view of the connection of the monitor and alarm system securements to the securements of the slave pump.

As illustrated in FIG. 5, the bar 76A is L-shaped in cross-section and is mounted to the bar 76 by a double L or a Z-shaped bracket 94 and fasteners 96, 98 respectively. Bar 72A would be similarly mounted to bar 72. This allows the mounting of the encoder 50 to sense the motion of the pump without interfering with the connection of the slave pump 78 to bars 72, 76. If no slave pump is provided, the encoder 50 may be mounted directly to the bars 72, 76. If a slave pump is to be provided, and there is a region of bars 72, 76 in which a slave pump will not be mounted, the encoder 50 could be mounted in that region.

Merely providing pulse representing the cycle of the pump 52, would not provide the direct reading of the weight of the material being dispensed. In prior art devices, either the specific gravity of the material being dispensed had to be programmed in to an electrical device, or the reading on the counter had to be converted by an appropriate table knowing the specific gravity and the capacity of the pump. The present encoding scheme using encoder 50 and the bars 72A, 76A provides a series of output pulses whose count directly indicates the weight of the material being dispensed.

The bar 72A, 76A includes a plurality of holes, each having an appropriate indicia indicating the specific gravity. The encoder 50 provides a specific number of pulses per cycle as a direct relationship to the capacity of the pump 52. Although FIG. 4 shows both bars 72A, 76A having indicia and a plurality of holes, only one bar may have indicia and/or a plurality of holes while the other bar has a single hole.

It should be noted that the sensor 36 senses the movement of the encoder 50 during the intake and the discharge stroke of the pump. Thus the encoder produces twice as many pulses as would occur during just the discharge stroke. For the display to read directly in grams, each pulse must represent a unit value. Thus for a 240 cc pump and a specific gravity of one, 24 pulses will represent 10 g each and will produce a weight reading of 240 g. The 24 pulses are produced, twelve during the intake cycle and twelve during the discharge cycle. If the maximum density of material being dispensed is 2, thereby requiring 48 pulses for a 240 cc pump, a total of 24 pulses must be produced during each stroke of the pump.

By connecting the encoder 50 at different positions along the bars 72A, 76A, more or less pulses are produced per cycle of the pump thereby reflecting the change in density and providing a signal which directly represents weight. This adjustment is a simple mechanical adjustment and does not require any programming of the pneumatic logic or circuitry.

The structure of FIG. 4, with the encoder and the indicia on the bars, also provides a convenient way of determining the specific density of the material. This can be used to determine the appropriate mixture of the materials being dispensed as well as the integrity of the seals of the pump. The method of determining specific density includes dispensing a predetermined volume of material into a container. This predetermined volume is then weighed. The value of the weighed material is compared against the weight displayed at 16 on counter 12. If the weight of the material of the fixed volume is greater than the value on display 16, the density is greater than that for the present connection of the encoder 50 to the bars 72A, 76A. Thus the position of the encoder 50 on the bars 72A, 76A is adjusted to a higher density.

The procedure is repeated in that a fixed volume is dispensed into a container and its contents is weighed and compared to the new reading of weight of display 16. This process is repeated until the weighed value matches the displayed value on display 16. Although the values may not match identically, the change of the specific gravity will continue until the relative difference between the weighed value and the displayed weight changes. For the previous example, wherein the weight is greater than the displayed weight, the specific gravity is changed until the actual weight matches the displayed weight or the displayed weight exceeds the actual weight. If there is not an actual match, the specific gravity is between the position of the encoder where the displayed weight exceeds the actual weight and the previous position.

As previously described, not only will the method of determining the densing determine the specific gravity of unknown materials, but can also verify the appropriate mixture of two elements of known specific gravities. So, for example if the ratio of filler (such as file retardant or extenders) to resin is not 30% mix and a known specific gravity of 0.7, any variation of the weight of a fixed volume to the displayed weight will indicate that the ratio of filler to resin is not 30%. Similarly, as the seals on the pump wear, it will not produce the same volume of output per stroke and therefore it will take more strokes to fill a given volume producing a greater weight on the display as compared to the weight of the specific volume.

Although the present invention has been described with respect to a spraying system as the dispenser, other dispensing systems may be used. Also, the encoder's relationship to pump capacity and the adjustable connection for specific gravity may be used in nonhazardous environments. Thus the sensor may be optical or any electrical sensor with an appropriate encoder.

Although the present invention has been described and illustrated in detail, it is to be clearly understood that the same is by way of illustration and example only, and is not to be taken by way of limitation. The spirit and scope of the present invention are to be limited only by the terms of the appended claims.

What is claimed:

1. A system for determining the weight of material dispensed by a dispenser having a pump, said system comprising:
    first and second telescopic members;
    an encoder on said first member and a sensor on said second member;
    calibration means adjustably mounting said first and second members between a pump and a first securement for determining displacement of one of said members for a cycle of said pump as a function of specific gravity of material being dispensed; and
    determining means for determining weight of material dispensed from signals from said sensor.

2. A system according to claim 1 wherein said sensor is pneumatic.

3. A system according to claim 2 wherein said encoder includes a series of spaced openings.

4. A system according to claim 1 wherein said first member is connected to said pump via said calibration means and said second member being mounted to said first securement via said calibration means.

5. A system according to claim 1 wherein said sensor is optical.

6. A system according to claim 1 wherein said calibration means includes a moveable bar pivotally connected at an end to a fixed bar and driven by said pump to oscillate about said pivot.

7. A system according to claim 6 wherein said moveable bar includes a plurality of openings to which one of said members is mounted.

8. A system according to claim 7 wherein said calibration means includes a plurality of openings in a fixed bar to which the other of said members is mounted.

9. A system according to claim 8 including indicia of specific gravity adjacent said openings.

10. A system according to claim 8 wherein said calibration means and said fixed bar include openings for connection of a slave pump.

11. A system according to claim 6 wherein said calibration means and said fixed bar include openings for connection of a slave pump.

12. A system according to claim 1 wherein:
    said sensor produces a series of pulses each representing a unit of weight as said members move relative to each other; and
    said determining means includes counter means for counting pulses and displaying counted pulses from said sensor directly as weight.

13. A system according to claim 12 including annunciator means for announcing when said counter means has reached a predetermined count.

14. A system according to claim 13 wherein said counter means and said annunciator means are resettable; and
    including a totalizer means of counting pulses and displaying counted pulses from said sensor and wherein said totalizer means is resettable independent from said counter means.

15. A system according to claim 14 wherein said sensor, counter means, said annunciator means and said totalizer means are pneumatic.

16. A system according to claim 12 wherein said sensor and said counter means are pneumatic.

17. A system according to claim 12 wherein said encoder corresponds to a predetermined volume per pump cycle to provide a predetermined number of pulses whereby said displayed count is a direct reading of weight.

18. A system according to claim 1 wherein said calibration means include indicia of specific gravity.

19. A system for determining the weight of material dispensed by a dispenser having a pump, said system comprising:
    an encoder means for providing a predetermined number of pulses per cycle of said pump as a function of the volume per cycle of said pump whereby each pulse represents a unit of weight; and
    calibration means adjustably mounting said encoder means between a pump and a first fixed securement for determining displacement of said encoding means for a cycle of said pump as a function of specific gravity of material being dispensed.

* * * * *